(12) United States Patent
Berg et al.

(10) Patent No.: US 12,224,821 B2
(45) Date of Patent: Feb. 11, 2025

(54) HYBRID FIBER CABLE DISTRIBUTED ANTENNA SYSTEM (HFC-DAS) NETWORK WITH MACHINE LEARNING BEAM

(71) Applicant: Telefonaktiebolaget LM Ericsson (publ), Stockholm (SE)

(72) Inventors: Miguel Berg, Sollentuna (SE); Elmar Trojer, Täby (SE); Roland Smith, Nepean (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 18/253,502

(22) PCT Filed: Nov. 18, 2021

(86) PCT No.: PCT/IB2021/060717
§ 371 (c)(1),
(2) Date: May 18, 2023

(87) PCT Pub. No.: WO2022/107047
PCT Pub. Date: May 27, 2022

(65) Prior Publication Data
US 2024/0014867 A1 Jan. 11, 2024

Related U.S. Application Data

(60) Provisional application No. 63/115,247, filed on Nov. 18, 2020.

(51) Int. Cl.
*H04B 7/0452* (2017.01)
*H04B 7/0456* (2017.01)
*H04L 12/28* (2006.01)

(52) U.S. Cl.
CPC ......... *H04B 7/0456* (2013.01); *H04B 7/0452* (2013.01); *H04L 12/2854* (2013.01)

(58) Field of Classification Search
CPC .. H04B 7/0456; H04B 7/0452; H04L 12/2854
See application file for complete search history.

(56) References Cited

U.S. PATENT DOCUMENTS

2019/0021066 A1 1/2019 Campos et al.
2020/0045737 A1 2/2020 Ly et al.
(Continued)

FOREIGN PATENT DOCUMENTS

WO 2019/204165 A1 10/2019
WO 2020/197453 A1 10/2020

OTHER PUBLICATIONS

Invitation to Pay Additional Fees and, Where Applicable, Protest Fee dated Mar. 4, 2022 issued in PCT Application No. PCT/IB2021/060717 filed Nov. 18, 2021, consisting of 13 pages.
(Continued)

*Primary Examiner* — Janice N Tieu
(74) *Attorney, Agent, or Firm* — Weisberg I.P. Law, P.A.

(57) ABSTRACT

A method, network node and customer premises equipment (CPE) and apparatus for 3$^{rd}$ Generation Partnership Project (3GPP) Fifth Generation (5G) hybrid fiber coax (HFC)-distributed antenna system (DAS) network with machine learning beam management are disclosed. According to one aspect, a method in a network node includes determining a set of beam weights for each CPE of the plurality of CPE, each set of beam weights being associated with a synchronization signal block, SSB, beam index, each SSB index being associated with a window of time for communication between the network node and CPE associated with a beam ID; and transmitting an SSB index to CPE associated with the beam ID to indicate to the CPE the window of time for communication between the network node and the CPE.

20 Claims, 13 Drawing Sheets

(56) References Cited

U.S. PATENT DOCUMENTS

2021/0234597 A1* 7/2021 Raghavan ............ H04B 7/0634
2021/0314055 A1* 10/2021 Meshkati ............. H04B 7/0617
2022/0352962 A1* 11/2022 Huang ................. H04B 7/0695
2023/0308894 A1* 9/2023 Malik ................... H04W 52/24

OTHER PUBLICATIONS

International Search Report and Written Opinion dated Apr. 29, 2022 issued in PCT Application No. PCT/IB2021/060717 filed Nov. 18, 2021, consisting of 18 pages.
ETSI TS 138 213 V15.3.0 (Oct. 2018) 5G; NR; Physical Layer Procedures for Control (3GPP TS 38.213 version 15.3.0 Release 15), consisting of 102 pages.
3GPP TS 38.213 V15.3.0 (Sep. 2018) 3rd Generation Partnership Project; NR; Physical Layer Procedures for Control (Release 15), consisting of 101 pages.

* cited by examiner

--PRIOR ART--

--PRIOR ART--

--PRIOR ART--

--PRIOR ART--

HYBRID FIBER CABLE DISTRIBUTED ANTENNA SYSTEM (HFC-DAS) NETWORK WITH MACHINE LEARNING BEAM

CROSS-REFERENCE TO RELATED APPLICATIONS

This application is a Submission Under 35 U.S.C. § 371 for U.S. National Stage Patent Application of International Application No.: PCT/IB2021/060717, filed Nov. 18, 2021 entitled "HYBRID FIBER CABLE DISTRIBUTED ANTENNA SYSTEM (HFC-DAS) NETWORK WITH MACHINE LEARNING BEAM," which claims priority to U.S. Provisional Application No. 63/115,247, filed Nov. 18, 2020, entitled "5G HFC-DAS NETWORK WITH MACHINE LEARNING BEAM," the entireties of both of which are incorporated herein by reference.

FIELD

The present disclosure relates to wireless communications, and in particular, to $3^{rd}$ Generation Partnership Project (3GPP) Fifth Generation (5G) hybrid fiber coax (HFC)-distributed antenna system (DAS) networks with machine learning beam management.

BACKGROUND

The Third Generation Partnership Project (3GPP) has developed and is developing standards for Fourth Generation (4G) (also referred to as Long Term Evolution (LTE)) and Fifth Generation (5G) (also referred to as New Radio (NR)) wireless communication systems. Such systems provide, among other features, broadband communication between network nodes, such as base stations, and mobile wireless devices (WD), as well as communication between network nodes and between WDs.

The hybrid fiber cable (HFC) network in the United States of America delivers NTSC (National Television Systems Committee) analog television signals and digital services to Cable modulator/demodulators (MODEMs) over the available plant bandwidth up to 1,002 MHz for Data Over Cable Service Interface Specification (DOCSIS) 3.0, up to 1,218 MHz for DOCSIS 3.1, and up to 1.8 GHz proposed for DOCSIS 4.0 using extended spectrum DOCSIS. In the downstream direction, the cable system is assumed to have a pass band with a lower edge of either 54 MHz or 108 MHz, and an upper edge that is implementation-dependent but is typically in the range of 300 to 1,002 MHz, for DOCSIS 3.0. Other countries use Phase Alternating Line (PAL) and other standards. While the network has evolved towards increasingly digital services, it has also allowed for mixed analog and digital services as defined in Society of Cable Telecommunications Engineers (SCTE)-40 Digital Cable Network Interface Standard.

Cable TV companies are providing broadband access services (e.g., television, data and/or voice) by using DOCSIS technology over a hybrid fiber-coax (HFC) infrastructure as shown in FIG. 1. Typically, around 500 premises are passed per fiber node (hub) with no more than 10 cascaded amplifiers s per strand. With DOCSIS 3.1 delivering 10 Gbit/s downstream (downlink) and 1 Gbit/s upstream (uplink), such a system provides around a full load committed information rate (CIR) of 20 Mbit/s in the downlink and 2 Mbit/s in the uplink.

To increase capacity, DOCSIS must be improved to support higher data rates which is technically challenging and costly. Another approach is to use 5G NR base-station equipment and transmit radio signaling on the HFC network, as shown in FIG. 2. As shown in FIG. 2, a 5G network node, e.g., a base station (gNB), with an appropriate analog front end (FE), transfers radio signals on either radio frequencies (RF) or intermediate frequencies (IF) on the coax network to a customer premises equipment (CPE). The CPE is configured to directly relay RF signals in the premises and/or by converting signals from IF to RF to be received by a 5G user terminal providing either local area network (LAN) services or Wi-Fi services in the premises. Also, an outdoor macro can be used to backhaul traffic by an outdoor antenna connected to the CPE.

An example of high-level internal components of the CPE are shown in the block diagram of FIG. 3. The coax front end connects to the coax portion of the HFC network. Filter blocks separate and combine different bands or frequency blocks for RF-IF conversion to be either directly repeated with internal or external antennas or to be processed by a WD to provide Ethernet LAN services or optionally to feed a Wi-Fi router or access point.

Another way of using 5G on the HFC network is by use of 3GPP Technical Release 16 (3GPP Rel-16) Integrated Access and Backhaul (IAB) technology. FIG. 4 shows an example of the CPE to be installed in the premises containing am analog cable front end (FE) similar to the analog front end of FIG. 3, connected to an Integrated access and IAB node (e.g., a wireless device (WD) connected to an gNB) providing backhaul on the HFC network as well as an access cell inside the premises.

The solution depicted in FIG. 2 provides the same wireless carriers in multiple premises due to the tree-structure of the coax network. Different carriers can be transferred in different IF frequency blocks on the coax network, but not in scale. With the same carrier(s) in each premises, a high amount of noise and interference is generated, thereby reducing network performance. This is especially true if many CPEs (repeaters) are active but the WD is only connected to a single CPE.

Existing cabled distribution cellular networks, including "Distributed Antenna Systems" (DAS), suffer from increased noise resulting from the analog summing of signals from multiple antennas. DAS networks typically connect network nodes, e.g., eNBs/gNBs, with multiple input multiple output (MIMO) RF outputs to many remote active radio antennas. While these systems are able to minimize uplink noise figure with configurable gain adjustments in each of the distributed antennas, they are unable to prevent noise floor increases caused by analog summing of signals.

These existing solutions have had partial success by introducing "coherent combining" circuits. However, these circuits are best effort approximations since true coherent combining of 3GPP signals requires time/frequency physical resource block (PRB) scheduling information for each WD carrier available only within the network node, for baseband processing. As such, existing DAS solutions have seen limited success in introducing technology to prevent noise floor increases. DAS installation manuals provide guidance on expected network performance as a function of the number of antennas.

There are no existing HFC network solutions as the current technology has not been applied to this space. If, for example, the neighborhood example shown in FIG. 1 is deployed with just 15 houses, the thermal noise floor would rise by 11.8 dB, which is significant. A typical neighborhood with 500 to 1000 houses would see a thermal noise floor rise of 27 dB to 30 dB which significantly adversely impacts link budgets and resulting system performance. While a 10 dB noise floor increase is readily handled by adjustments to network node parameter configurations, a 27 dB to 30 dB increase will make the solution uneconomical and impractical.

Another issue with today's networks is the ability to determine the WD position in a cabled single carrier repeated deployment. DAS networks localize WD position to the set of active antennas which cover a cell. These networks are engineered with coverage areas of floors, or seating sections of a stadium bowl, or the concourse area of a floor to provide approximate location information. There are no HFC 3GPP deployed network solutions and therefore no existing positioning technologies for cellular radio via CPE.

SUMMARY

Some embodiments advantageously provide methods, network nodes and CPEs for Fifth Generation (5G) hybrid fiber coax (HFC)-distributed antenna system (DAS) network with machine learning beam management.

Some embodiments solve the issue of degraded system performance due to the deployment of CPEs in every premises or flat in a multi-dwelling unit containing a wireless up-/downconverter (repeater) to provide wireless NR coverage in the premises by repeating the NR signal from the HFC network on the correct RF band. The disclosure also provides a solution to manage uplink (upstream) noise to enable deployments in this customer space.

For a set of repeaters using the same NR carrier and the same spatial streams, each repeater (or small group of repeaters) is treated as one or more beams and 3GPP beam management functionality is used to determine which repeaters should be active. As an example, premises (or group of premises), flats (or group of flats or whole multi-dwelling unit) use a specific synchronization signaling block (SSB). This is illustrated in FIG. 5.

Beam sweeping with different SSB indices and/or channel state information reference signals (CSI-RS) is used to determine which repeater (or small group of repeaters) is serving a given WD and to mute the repeaters which have no active WDs. For 5G NR frequency range 2 (FR2), up to 64 SSB indices are available (depending on, for example, a time division duplex (TDD) pattern). This limit is defined in 3GPP Technical Standard (TS) 38.213 Version 15.3.0, Release 15 (3GPP Rel-15) and (European Telecommunications Standards Institute (ETSI) Document "ETSI TS 138 213 V15.3.0 (2018-10)." These standards explain WD behavior that limits the maximum number "L" of SS/PBCH blocks per half frame. This is explained in Table 5-1 to 64 of the ETSI document.

Some embodiments provide for mapping the CPE onto the available set of beam indices, employing a random algorithm, or alternately, though machine learning grouping algorithms. These algorithms further improve upstream and downstream throughput performance by grouping CPEs both geographically and according to their common cable plant impairments. As such, using Machine Learning to learn of these key attributes, an HFC deployed base station or network node (gNB) can extend its CPE coverage from 64 unique premises, to 64 geographical zones, each of which experiences common impairments which can be mitigated using beam weighting.

According to one aspect, a network node is configured to communicate with a plurality of customer premises equipment, CPE. The network node includes: processing circuitry configured to determine a set of beam weights for each CPE of the plurality of CPE, each set of beam weights being associated with a synchronization signal block, SSB, beam index, each SSB index being associated with a window of time for communication between the network node and CPE associated with a beam ID. The network node also includes a communication interface in communication with the processing circuitry, the communication interface configured to transmit an SSB index to CPE associated with the beam ID to indicate to the CPE the window of time for communication between the network node and the CPE.

According to this aspect, in some embodiments, the set of beam weights for a subset of CPE of the plurality of CPE are determined in order to correct impairments associated with the subset of CPE. In some embodiments, the set of beam weights for a subset of CPE are determined in order to equalize transmit carriers configured for the CPE. In some embodiments, the processing circuitry is further configured to determine an allocation of SSBs to CPE that provides a least uplink noise floor. In some embodiments, the processing circuitry is further configured to determine a grouping of SSBs associated with CPE having impairment commonality. In some embodiments, the grouping of SSBs associated with CPE having impairment commonality is determined by machine learning. In some embodiments, the machine learning is based at least in part on determining an assignment of SSB beam indices to CPE that results in a least noise floor. In some embodiments, the machine learning is based at least in part on locations of the plurality of CPE. In some embodiments, the machine learning is based at least in part on at least one measured data-over-cable service interface specification, DOCSIS, parameter. In some embodiments, the machine learning is based at least in part on at least one CPE embedded wireless device uplink noise floor measurement.

According to another aspect, a method in a network node configured to communicate with a plurality of customer premises equipment, CPE, is provided. The method includes determining a set of beam weights for each CPE of the plurality of CPE, each set of beam weights being associated with a synchronization signal block, SSB, beam index, each SSB index being associated with a window of time for communication between the network node and CPE associated with a beam ID. The method also includes transmitting an SSB index to CPE associated with the beam ID to indicate to the CPE the window of time for communication between the network node and the CPE.

According to this aspect, in some embodiments, the set of beam weights for subset of CPE of the plurality of CPE are determined in order to correct impairments associated with the subset of CPE. In some embodiments, the set of beam weights for a subset of CPE are determined in order to equalize transmit carriers configured for the CPE. In some embodiments, the method also includes determining an allocation of SSBs to CPE that provides a least uplink noise floor. In some embodiments, the method also includes determining a grouping of SSBs associated with CPE having impairment commonality. In some embodiments, the grouping of SSBs associated with CPE having impairment commonality is determined by machine learning. In some embodiments, the machine learning is based at least in part on determining an assignment of SSB beam indices to CPE that results in a least noise floor. In some embodiments, the machine learning is based at least in part on locations of the plurality of CPE. In some embodiments, the machine learning is based at least in part on at least one measured data-over-cable service interface specification, DOCSIS, parameter. In some embodiments, the machine learning is based at least in part on at least one CPE embedded wireless device uplink noise floor measurement.

According to yet another aspect, a CPE configured to communicate with a network node is provided. The CPE includes a communication interface configured to: receive a synchronization signal block, SSB, beam index from the network node, the SSB index being associated with a window of time for communication between the network node and the CPE; and communicate with the network node during the window of time and refrain from transmitting to the network node outside the window of time.

According to another aspect, a method in a customer premises equipment, CPE, configured to communicate with a network node is provided. The method includes receiving a synchronization signal block, SSB, beam index from the network node, the SSB index being associated with a window of time for communication between the network node and the CPE. The method also includes communicating with the network node during the window of time and refraining from transmitting to the network node outside the window of time.

According to another aspect, a network node is configured to communicate with a plurality of customer premises equipment, CPE. The network node includes a connection to a Data Over Cable Service Interface Specification, DOCSIS, cable network to which the plurality of CPE are connected. The network node includes processing circuitry configured to synchronize the plurality of CPE and assign synchronization signal blocks (SSBs) to the plurality of CPE.

According to this aspect, in some embodiments, a set of beam weights for a subset of CPE of the plurality of CPE are determined to correct impairments associated with the subset of CPE. In some embodiments, the set of beam weights for a subset of CPE are determined in order to equalize a plurality of transmit carriers configured for the subset of CPE. In some embodiments, synchronizing the plurality of CPE further comprises synchronizing wireless devices connected wirelessly to the CPE.

According to yet another aspect, a method in a network node configured to communicate with a plurality of customer premises equipment, CPE, is provided. The method includes connecting to a Data Over Cable Service Interface Specification, DOCSIS, cable network to which the plurality of CPE are connected. The method also includes synchronizing the plurality of CPE and assigning synchronization signal blocks, SSBs, to the plurality of CPE.

According to this aspect, in some embodiments, a set of beam weights for a subset of CPE of the plurality of CPE are determined to correct impairments associated with the subset of CPE. In some embodiments, the set of beam weights for a subset of CPE are determined in order to equalize a plurality of transmit carriers configured for the subset of CPE. In some embodiments, synchronizing the plurality of CPE further comprises synchronizing wireless devices connected wirelessly to the CPE.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
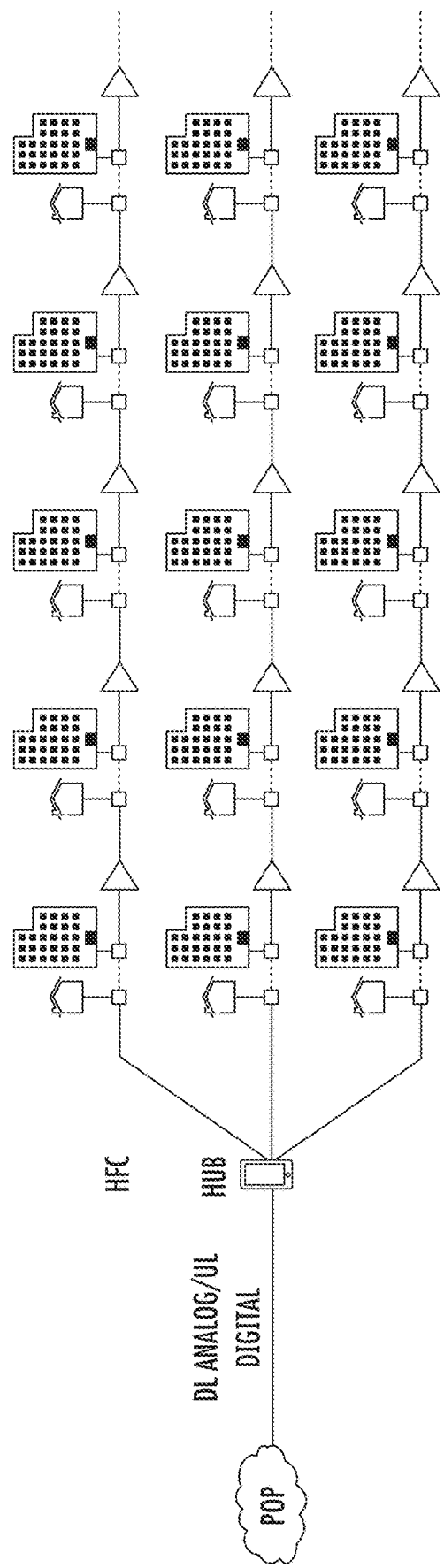
FIG. 1 illustrates a HFC network that includes a plurality of customer premises.
Figure 2:
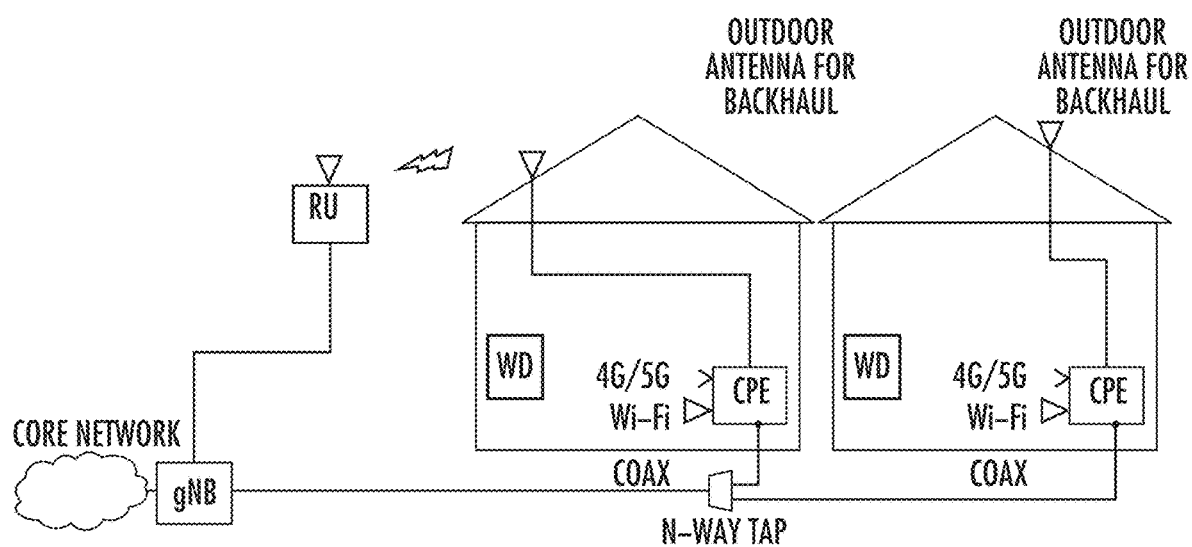
FIG. 2 illustrates a coaxial cable between a gNB and CPEs.
Figure 3:
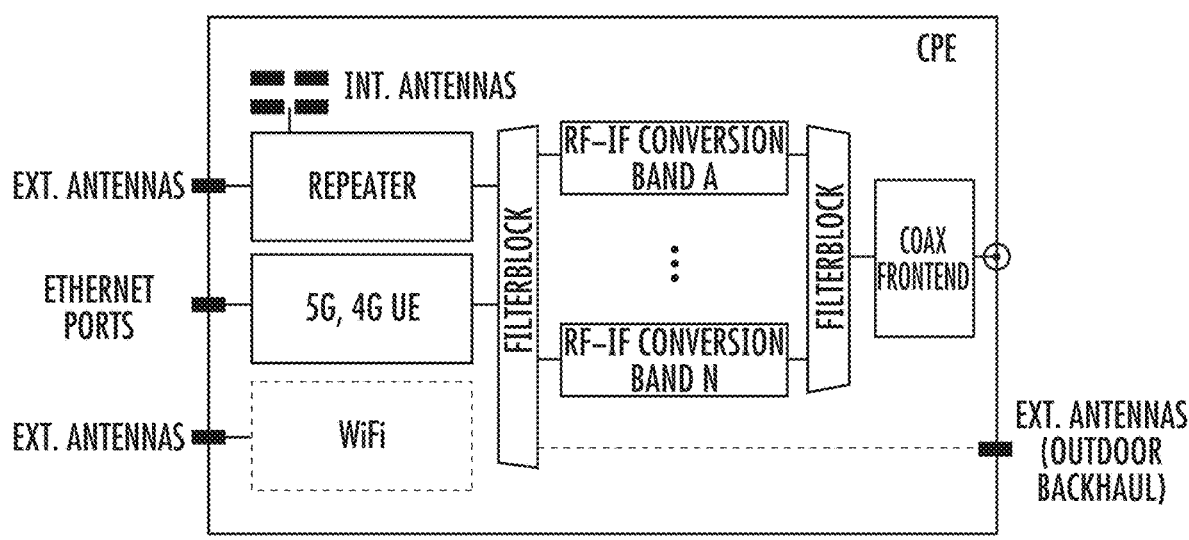
FIG. 3 illustrates a CPE.
Figure 4:
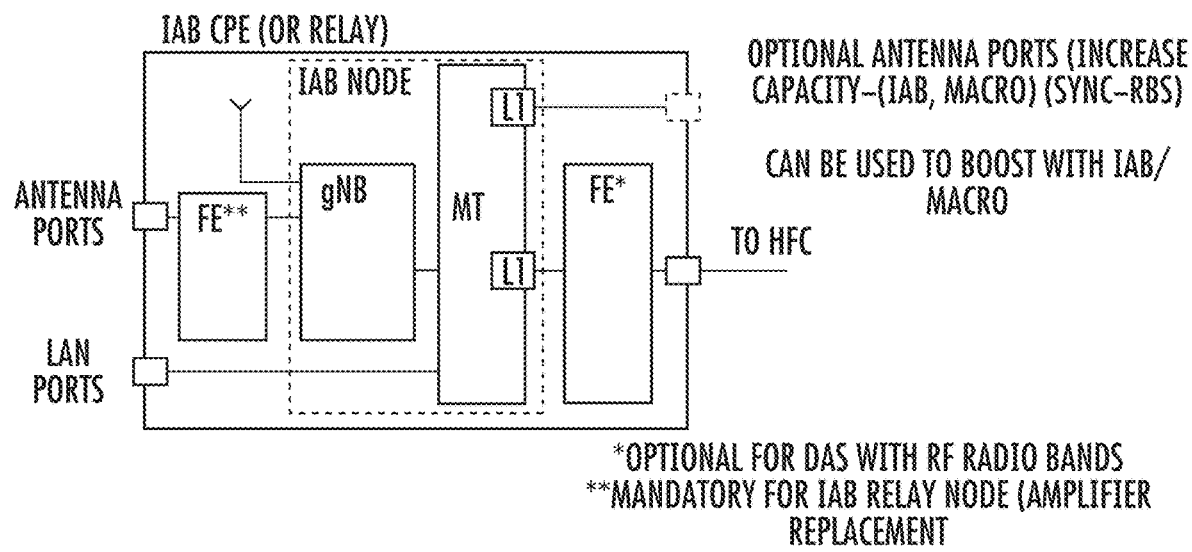
FIG. 4 illustrates an alternative view of a CPE.
Figure 5:
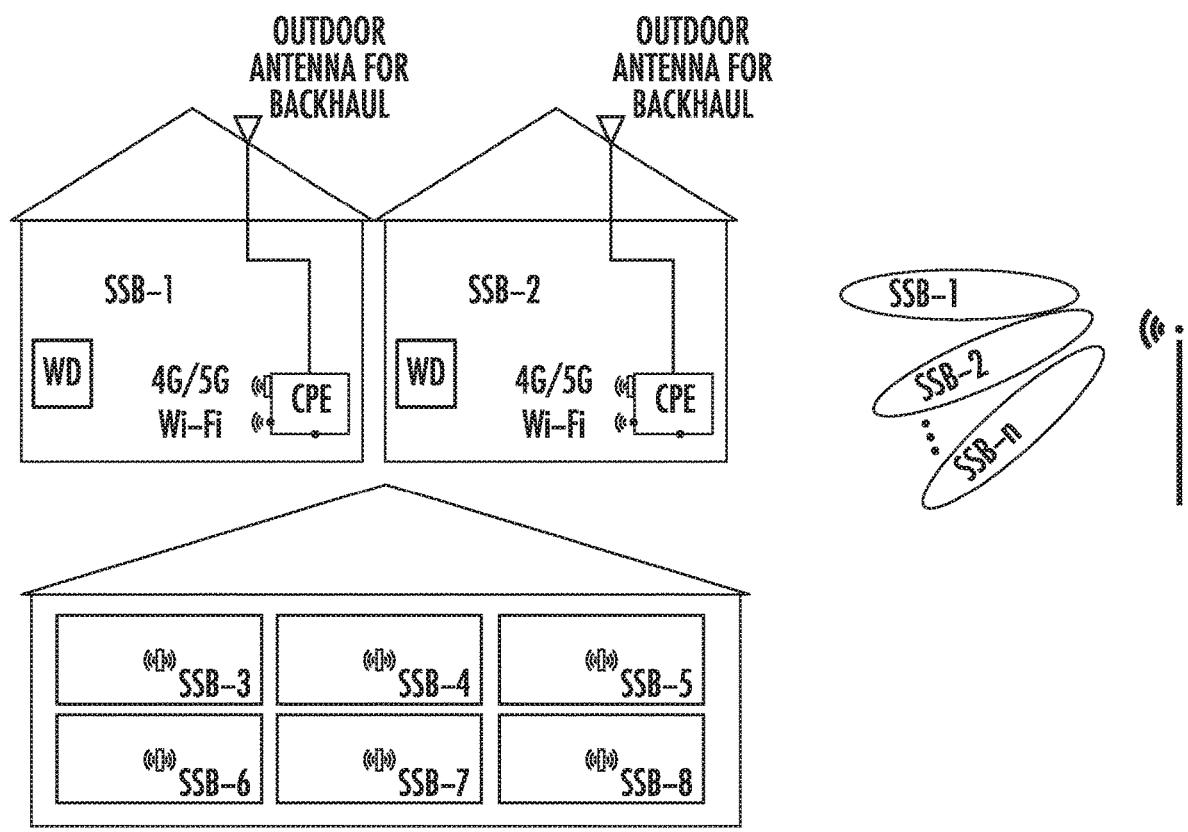
FIG. 5 illustrates beams associated with SSBs.

Before describing in detail example embodiments, it is noted that the embodiments reside primarily in combinations of apparatus components and processing steps related to Fifth Generation (5G) hybrid fiber coax (HFC)-distributed antenna system (DAS) network with machine learning beam management. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device or user equipment capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH) and a lower layer split distributed unit (LLS-DU).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

The disclosure relates to an HFC network (DOCSIS or DAS) utilizing 5G NR cellular technology to provide fixed mobile broadband (MBB) service with high performance (in terms of capacity and/or coverage, for example) and WD positioning support.

In some embodiments, the network node, e.g., gNB, may be connected to all CPE which are limited in some embodiments to 64 beam indices. While this limitation may be relevant in some applications, it is worth noting that each CPE may be arranged to support all connected WDs which may be several per customer premises. It is noted, however, that limits and ranges referred to herein are for example only, and may be with respect to a particular embodiment. The disclosure should not be construed as implying or requiring any specific limits or ranges.

Figure 6:
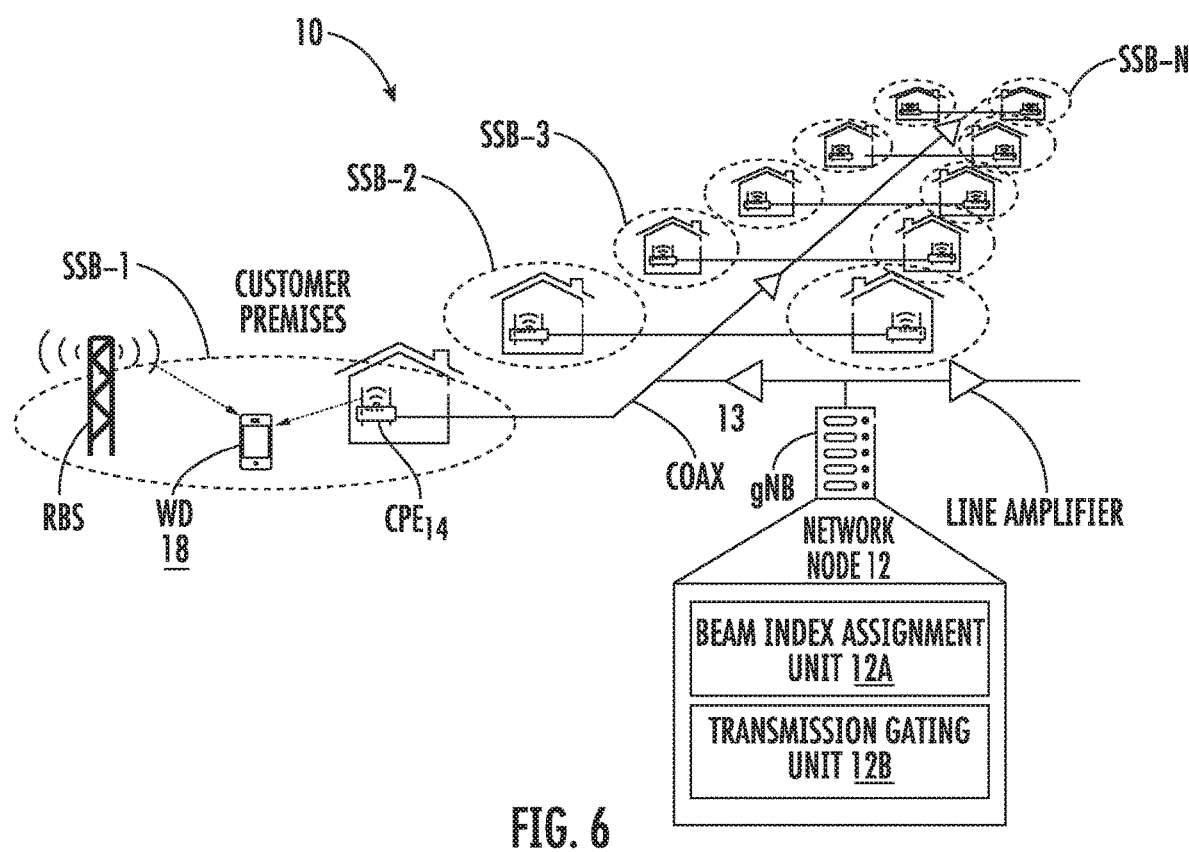
FIG. 6 illustrates an example HFC network.

Returning now to the drawing figures in which like reference numerals indicate like elements. FIG. 6 depicts a coaxial cable plant 10 served by a network node 12 feeding 5G/NR signals into the coaxial cable plant, which is distributed throughout a neighborhood. Long cable runs may require additional line amplifiers 13 in the coaxial cable plant to ensure that the cable modem termination system (CMTS) and signal levels of CPE 14 remain above 0 dBmV target levels. Each of a plurality of CPEs 14 have one or more attached WDs 18, and each CPE 14 is assigned an SSB index (SSB-1 through SSB-N) that defines the specific time periods when downlink (DL) and uplink (UL) transmissions are allowed. This SSB index has an associated set of beam weights unique to that CPE 14 to correct localized impairments and equalize the transmitted carriers. The embodiment shown in FIG. 6 is arranged such that each Customer Premises CPE is assigned a separate beam ID value so that the beamforming weights of a beamformer of the network node 12 are unique to that CPE. In some embodiments, coverage may be limited to the immediate vicinity of the CPE and may only extend a distance of one to two hundred meters.

The CPE 14 may also use the SSB index to determine when to enable UL transmissions and when to mute or disable UL transmissions. This dynamic switching of CPE UL transmissions maintains the lowest possible UL noise floor, where only one CPE 14 can transmit at a time. With a well-designed UL gain, the resulting noise figure seen at the network node 12, even through multiple series line amplifiers 13, can be quite minimal.

Therefore, in some embodiments, the network node 12 may be configured to include a beam index assignment unit 12A configured to determine a set of beam weights for each CPE of a plurality of CPEs, each set of beam weights being associated with a different SSB index and a window of time for communication between the network node and CPE associated with a beam ID. The network node 12 may further be configured to include a transmission gating unit 12B configured to gate transmission of signals to, and reception of signals from, each of a plurality of WDs 18 by the CPE 14.

The example of FIG. 6 has the potential for RF performance similar to an antenna network node 12, e.g., gNB, even though there may be as many as 64 connected CPE 14. Moreover, this example embodiment provides CPE 14 level locating of WDs, and therefore has a typical resolution of the dwelling and surrounding property.

Figure 7:
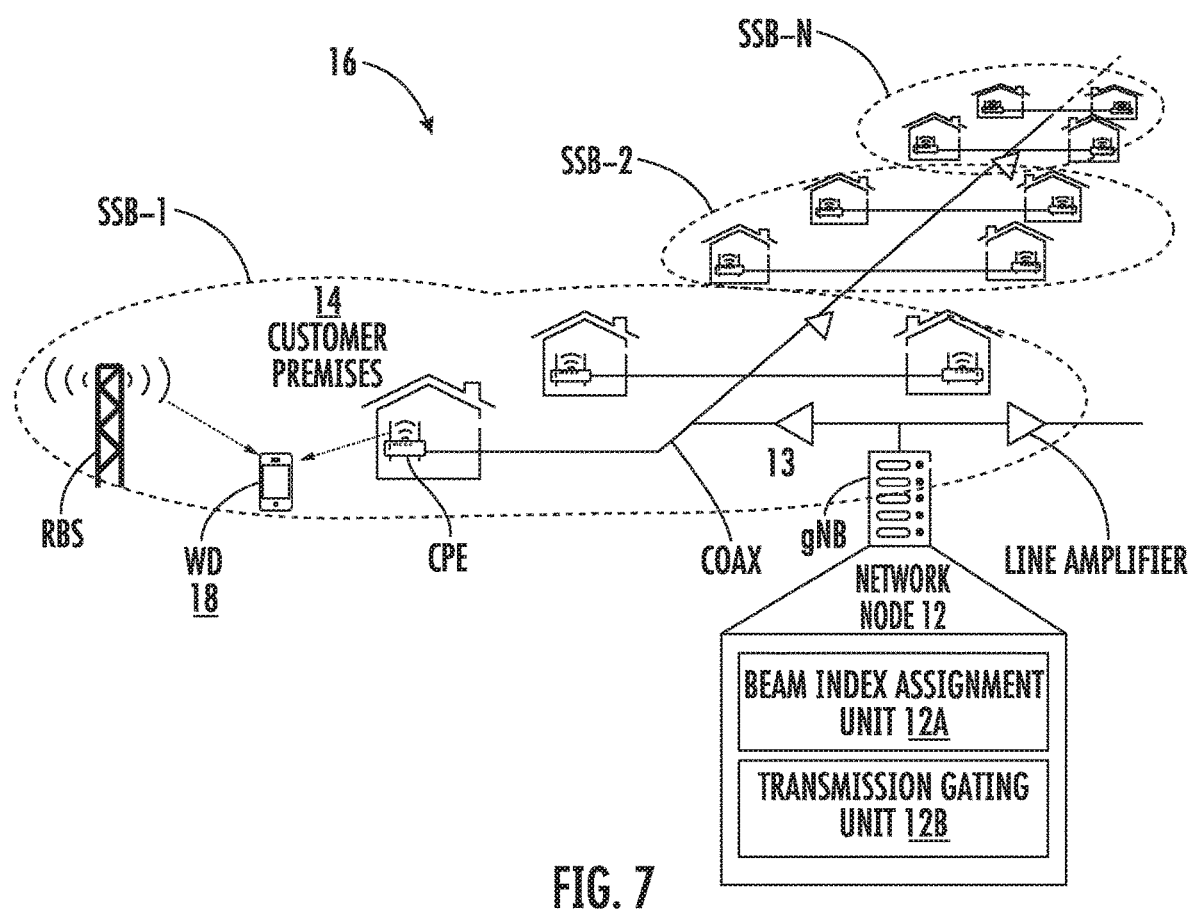
FIG. 7 illustrates an alternative example of an HFC network.

Another embodiment shown in FIG. 7. In the embodiment of FIG. 7, a communication system 16 groups multiple CPE 14 into separate beam IDs both geographically, and through machine learning. Beamforming weights are unique to each beam ID, which are uniquely grouped by machine learning algorithms to have similar impairments caused by line amplifiers 13, long cable runs, filters, and other similar elements. In FIG. 7, a differentiator for these groups is the line amplifier separation.

In some embodiments, the network node 12 in FIG. 7 may be connected to more than 64 CPE 14 since each beam ID may be shared by two or more CPE 14. Each CPE 14 may have one or more attached WDs, as shown in FIG. 7.

The process of assigning CPE 14 to beam IDs may be pre-provisioned, but as sales increase, automation may be inevitable. Some embodiments disclosed herein use machine learning algorithms to assess key parameters from the CPE 14-to-network node 12 cable plant connectivity, augmented by attached WD feedback to optimally assign a CPE 14 to a beam ID. Note that while geographic information is useful in this assignment, many premises, apartments, and business which may be in close geographic proximity are often connected to completely different branches and distribution points within the HFC plant so that the CPE 14 may not share a common connectivity path to the network node 12. Since connectivity path commonality and HFC plant impairments are strongly correlated, the machine learning algorithms may optimize both geographic co-location and impairment commonality. These algorithms enable multiple CPE 14 to share a common beam ID, with machine learning defined bounds on the allowed deviations in impairment cancellation.

The number of CPE 14 assigned to a beam ID may be limited, for example, to 8 or 16 for an effective rise in noise floor of 9 dB to 12 dB. These rises in noise floor can be accommodated through changes in network parameter configurations at the network node 12. The extent of the rise in noise to be accommodated may be dependent on the radio access technology being employed.

The example embodiment of FIG. 7 increases the number of supported CPE 14 from 64 to over 1000 for an assignment of 16 CPE 14 per beam ID, possibly limited by the available and supported beam IDs.

Machine learning does not have a hard limit, as it is able to leverage noise floor readings to assess if the limit on the number of CPE 14 assigned to a beam ID should be 8, 16, or higher. This is not a trivial task for an installer to assess by reviewing HFC network drawings, and is therefore a candidate for machine learning.

Noise floors are a function of multiple parameters, including for example the upstream noise figure of the CPE signals assigned to the beam ID. Some CPE 14 may be located very close to the network node 12 behind a single line amplifier and may have a low noise figure, and therefore a low noise floor. In this case, the machine learning algorithm may see a 3 dB lower noise floor and assign CPE 14 to the beam ID. In another case, a group of CPE 14 may be in a high-rise apartment building, and the machine learning algorithm would employ CPE sensor feedback on elevation to assign only devices from the same floor to the beam ID, in order to meet FCC regulations for E911 service.

The embodiments of FIGS. 6 and 7 enable a single network node 12 radio to connect to many CPE 14, e.g., 5G/NR CPE, all connected to a distributed hybrid fiber coaxial cable network. Further, SSB beam management may be used to correct for plant impairments to solve the problem of excessive noise floor rises which threaten the performance and viability of a network node-HFC product offering.

Figure 8:
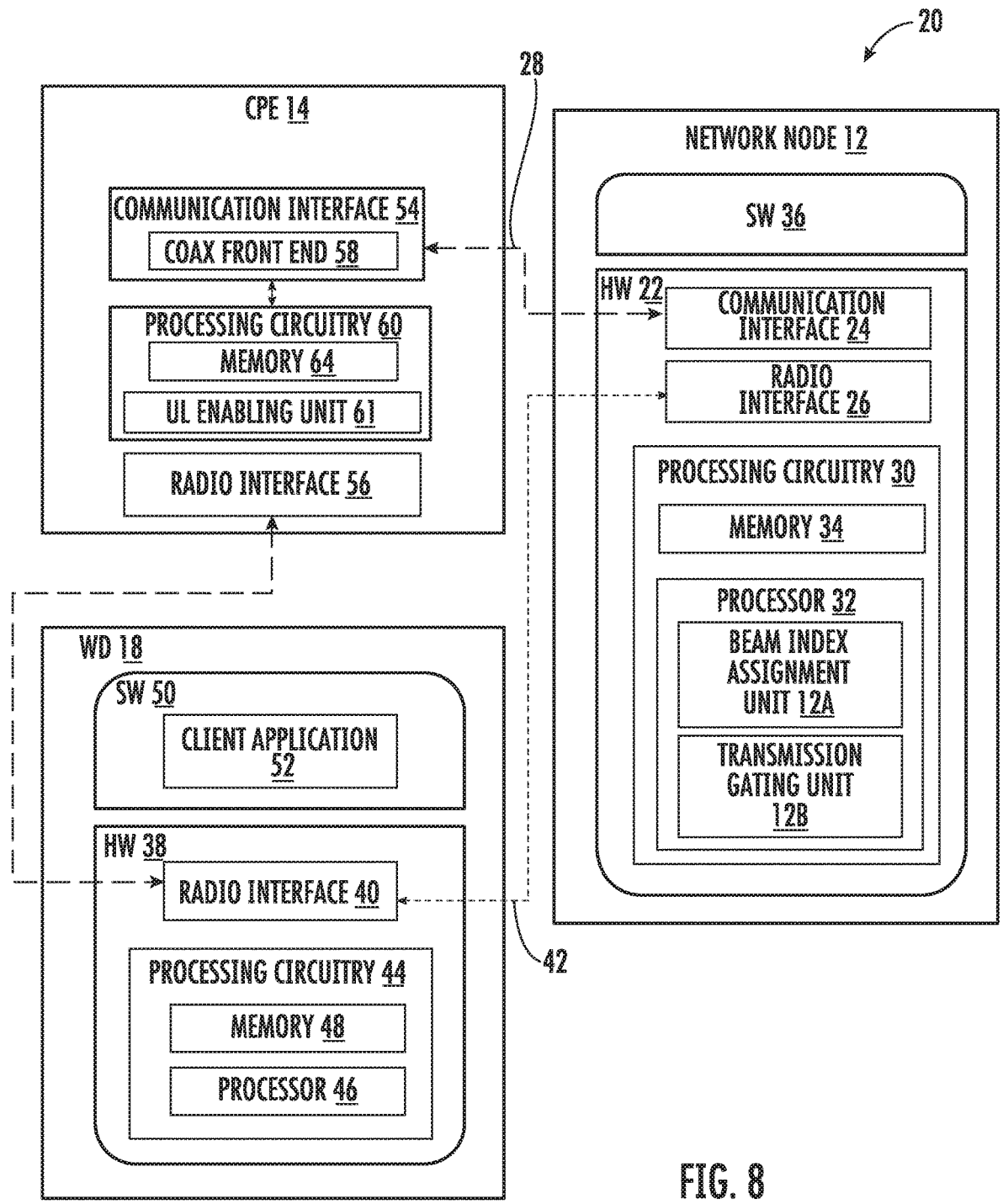
FIG. 8 is a block diagram of a cable/RF communication system.

Machine learning algorithms are employed to assign multiple CPE 14 to beam IDs to ensure that network performance is maintained, and regulatory E911 location requirements are met FIG. 8 is a block diagram showing network node 12 provided in a communication system 20 and including hardware 22 enabling the network node 12 to communicate with the WD 18 and the CPE 14. The hardware 22 may include a communication interface 24 for setting up and maintaining a wired or wireless connection with an interface of a different communication device of the communication system 20, as well as a radio interface 26 for setting up and maintaining at least a wireless connection with the WD 18 located in a coverage area served by the network node 12. The radio interface 26 may be formed as or may include, for example, one or more RF transmitters, one or more RF receivers, and/or one or more RF transceivers. The communication interface 24 may be configured to facilitate a connection over a HFC 28 to the CPE 14.

In the embodiment shown, the hardware 22 of the network node 12 further includes processing circuitry 30. The processing circuitry 30 may include a processor 32 and a memory 34. In particular, in addition to or instead of a processor, such as a central processing unit, and memory, the processing circuitry 30 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 32 may be configured to access (e.g., write to and/or read from) the memory 62, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 12 further has software 36 stored internally in, for example, memory 34, or stored in external memory (e.g., database, storage array, network storage device, etc.) accessible by the network node 12 via an external connection. The software 36 may be executable by the processing circuitry 30. The processing circuitry 30 may be configured to control any of the methods and/or processes described herein and/or to cause such methods, and/or processes to be performed, e.g., by network node 12. Processor 32 corresponds to one or more processors 32 for performing network node 12 functions described herein. The memory 34 is configured to store data, programmatic software code and/or other information described herein. In some embodiments, the software 36 may include instructions that, when executed by the processor 32 and/or processing circuitry 30, causes the processor 32 and/or processing circuitry 30 to perform the processes described herein with respect to network node 12.

For example, the processing circuitry 30 may be configured to include a beam index assignment unit 12A configured to determine a set of beam weights for each CPE of a plurality of CPEs, each set of beam weights being associated with a different SSB index and a window of time for communication between the network node 12 and CPE associated with a beam ID. The processing circuitry 30 may further be configured to include a transmission gating unit 12B configured to gate transmission of signals to, and reception of signals from, each of a plurality of WDs 18 by the CPE 14.

Thus, according to one aspect, a network node 12 is configured to communicate with a plurality of customer premises equipment, CPE 14. The network node 12 includes: processing circuitry 30 configured to determine a set of beam weights for each CPE 14 of the plurality of CPE 14, each set of beam weights being associated with a synchronization signal block, SSB, beam index, each SSB index being associated with a window of time for communication between the network node 12 and CPE 14 associated with a beam ID. The network node also includes a communication interface 24 in communication with the processing circuitry 30, the communication interface 24 configured to transmit an SSB index to CPE 14 associated with the beam ID to indicate to the CPE 14 the window of time for communication between the network node 12 and the CPE 14.

According to this aspect, in some embodiments, the set of beam weights for a subset of CPE 14 of the plurality of CPE 14 are determined in order to correct impairments associated with the subset of CPE 14. In some embodiments, the set of beam weights for a subset of CPE 14 are determined in order to equalize transmit carriers configured for the CPE 14. In some embodiments, the processing circuitry 30 is further configured to determine an allocation of SSBs to CPE 14 that provides a least uplink noise floor. In some embodiments, the processing circuitry 30 is further configured to determine a grouping of SSBs associated with CPE 14 having impairment commonality. In some embodiments, the grouping of SSBs associated with CPE 14 having impairment commonality is determined by machine learning. In some embodiments, the machine learning is based at least in part on determining an assignment of SSB beam indices to CPE 14 that results in a least noise floor. In some embodiments, the machine learning is based at least in part on locations of the plurality of CPE 14. In some embodiments, the machine learning is based at least in part on at least one measured data-over-cable service interface specification, DOCSIS, parameter. In some embodiments, the machine learning is based at least in part on at least one CPE 14 embedded wireless device uplink noise floor measurement.

The communication system 20 further includes the WD 18 already referred to. The WD 18 may have hardware 38 that may include a radio interface 40 configured to set up and maintain a wireless connection 42 with the network node 12 serving a coverage area in which the WD 18 is currently located. The radio interface 40 may be formed as or may include, for example, one or more RF transmitters, one or more RF receivers, and/or one or more RF transceivers.

The hardware 38 of the WD 18 further includes processing circuitry 44. The processing circuitry 44 may include a processor 46 and memory 48. In particular, in addition to or instead of a processor, such as a central processing unit, and memory, the processing circuitry 44 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 46 may be configured to access (e.g., write to and/or read from) memory 48, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 18 may further comprise software 50, which is stored in, for example, memory 48 at the WD 18, or stored in external memory (e.g., database, storage array, network storage device, etc.) accessible by the WD 18. The software may be executable by the processing circuitry 44. The software 50 may include a client application 52. The client application 52 may be operable to provide a service to a human or non-human user via the WD 18.

The processing circuitry 44 may be configured to control any of the methods and/or processes described herein and/or to cause such methods, and/or processes to be performed, e.g., by WD 18. The processor 46 corresponds to one or more processors 46 for performing WD functions described herein. The WD 18 includes memory 48 that is configured to store data, programmatic software code and/or other information described herein. In some embodiments, the software 50 and/or the client application 52 may include instructions that, when executed by the processor 46 and/or processing circuitry 44, causes the processor 46 and/or processing circuitry 44 to perform the processes described herein with respect to WD 18.

The wireless connection 42 between the WD 18 and the network node 12 is in accordance with the teachings of the embodiments described throughout this disclosure. The teachings of some of these embodiments may improve the data rate, latency, and/or power consumption and thereby provide benefits such as reduced user waiting time, relaxed restriction on file size, better responsiveness, extended battery lifetime, etc.

FIG. 8 also includes the CPE 14. The CPE 14 may include a communication interface 54 and a radio interface 56. The communication interface 54 is configured to include the coax front end 58. The communication interface 54 is configured to receive signals from the communication interface 24 of the network node 12 and transmit signals to the communication interface 24 of the network node 12 over the HFC 28. The CPE 14 includes a radio interface 56 the enables RF communication with the WD 18. The radio interface 56 is coupled to the communication interface 54 to convey signals to the communication interface 54 and convey signals from the communication interface 54 to the radio interface 56.

The radio interface 56 is configured to include processing circuitry 60. The processing circuitry 60 includes an uplink enabling unit 61 configured to determine when to enable uplink transmissions from wireless devices to the network node 12 based at least in part on the received beam index. In some embodiments, the uplink enabling unit 61 enables communicating with the network node 12 during a window of time and refraining from transmitting to the network node 12 outside the window of time The components of the CPE 14 may be implemented in integrated circuitry. The processing circuitry may correspond to one or more processors for performing CPE functions described herein. The CPE 14 may include a memory 64 that is configured to store data, programmatic software code and/or other information described herein. The processing circuitry 60 may comprise integrated circuitry for processing and/or control, e.g., one or more processors and/or processor cores and/or FPGAs (Field Programmable Gate Array) and/or ASICs (Application Specific Integrated Circuitry) adapted to execute instructions.

The memory 64 may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory). The radio interface 56 may be formed as or may include, for example, one or more RF transmitters, one or more RF receivers, and/or one or more RF transceivers.

Thus, in some embodiments, a CPE 14 configured to communicate with a network node 12 is provided. The CPE 14 includes a communication interface 54 configured to: receive a synchronization signal block, SSB, beam index from the network node 12, the SSB index being associated with a window of time for communication between the network node 12 and the CPE 14; and communicate with the network node 12 during the window of time and refrain from transmitting to the network node 12 outside the window of time.

Although FIG. 8 show various "units" such as the beam index assignment unit 12A, transmission gating unit 12B and UL enabling unit 61 as being within a respective processor, it is contemplated that these units may be implemented such that a portion of the unit is stored in a corresponding memory within the processing circuitry. In other words, the units may be implemented in hardware or in a combination of hardware and software within the processing circuitry. Also, although network node 12, CPE 14 and WD 18 are shown as directly connected, it is understood that such depiction is merely for convenience and to aid understanding. It is contemplated that there may be intermediary components facilitating communications among network node 12, CPE 14 and WD 18.

Figure 9:
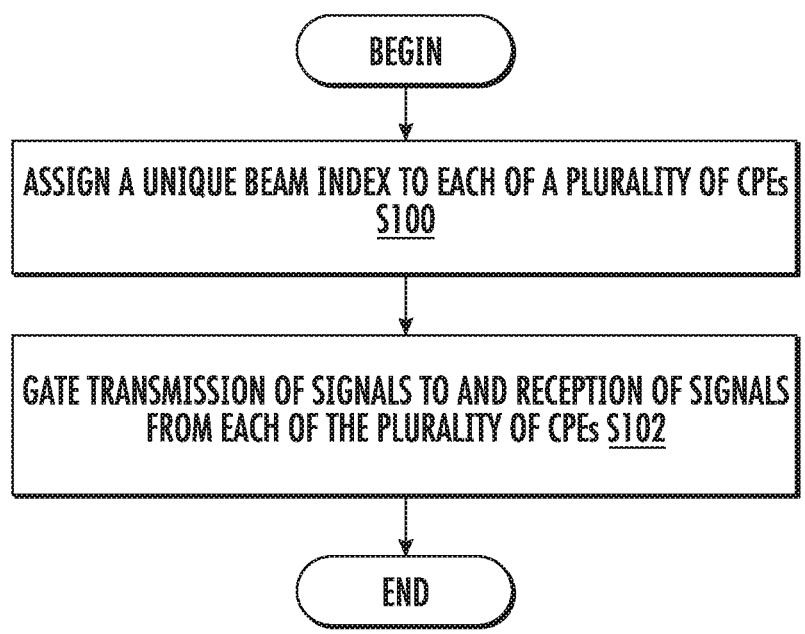
FIG. 9 is a flowchart of an example process in a network node for Fifth Generation (5G) hybrid fiber coax (HFC)-distributed antenna system (DAS) network with machine learning beam management.

FIG. 9 is a flowchart of an example process in a network node 12 for Fifth Generation (5G) hybrid fiber coax (HFC)-distributed antenna system (DAS) network with machine learning beam management. One or more blocks described herein may be performed by one or more elements of network node 12 such as by one or more of processing circuitry 30 (including the beam index assignment unit 12A and transmission gating unit 12B), processor 32, radio interface 26 and/or communication interface 24. Network node 12 such as via processing circuitry 30 and/or processor 32 and/or radio interface 26 and/or communication interface 24 is configured to assign a unique beam ID to each of a plurality of CPEs (Block S100). The process also includes gating transmission of signals to and reception of signals from each of the plurality of CPEs (Block S102).

Figure 10:
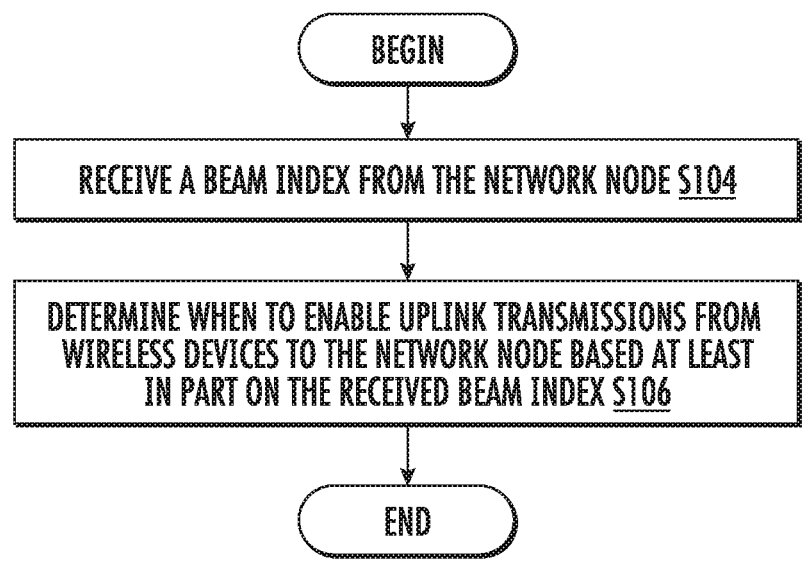
FIG. 10 is a flowchart of an example process in a wireless device for Fifth Generation (5G) hybrid fiber coax (HFC)-distributed antenna system (DAS) network with machine learning beam management.

FIG. 10 is a flowchart of an example process in a CPE 14 according to some embodiments of the present disclosure. One or more blocks described herein may be performed by one or more elements of CPE 14 such as by one or more of processing circuitry 60 (including the UL enabling unit 61), and/or radio interface 56 and/or communication interface 54. CPE 14 such as via processing circuitry 60 and/or radio interface 56 is configured to receive a beam index from the network node 12 (Block S104). The process also includes determining when to enable uplink transmissions from wireless devices to the network node based at least in part on the received beam index (Block S106).

Figure 11:
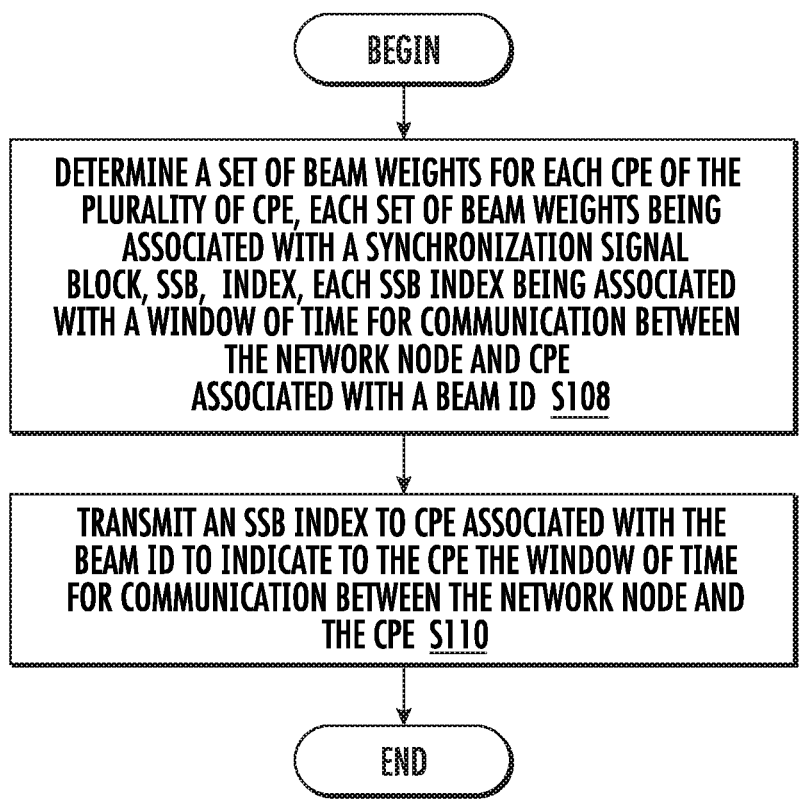
FIG. 11 is a flowchart of another example process in a network node for a 5G HFC-DAS with machine learning beam management according to principles set forth herein.

FIG. 11 is a flowchart of an example process in a network node for Fifth Generation (5G) hybrid fiber coax (HFC)-distributed antenna system (DAS) network with machine learning beam management. One or more blocks described herein may be performed by one or more elements of network node 12 such as by one or more of processing circuitry 30 (including the beam index assignment unit 12A and transmission gating unit 12B), processor 32, radio interface 26 and/or communication interface 24. Network node 12 such as via processing circuitry 30 and/or processor 32 and/or radio interface 26 and/or communication interface 24 is configured to determine a set of beam weights for each CPE 14 of the plurality of CPE 14, each set of beam weights being associated with a synchronization signal block, SSB, beam index, each SSB index being associated with a window of time for communication between the network node and CPE 14 associated with a beam ID (Block S108). The process further includes transmitting an SSB index to CPE 14 associated with the beam ID to indicate to the CPE 14 the window of time for communication between the network node 12 and the CPE 14 (Block S110).

In some embodiments, the set of beam weights for subset of CPE 14 of the plurality of CPE 14 are determined in order to correct impairments associated with the subset of CPE 14. In some embodiments, the set of beam weights for a subset of CPE 14 are determined in order to equalize transmit carriers configured for the CPE 14. In some embodiments, the process also include determining an allocation of SSBs to CPE 14 that provides a least uplink noise floor. In some embodiments, the process also includes determining a grouping of SSBs associated with CPE 14 having impairment commonality. In some embodiments, the grouping of SSBs associated with CPE 14 having impairment commonality is determined by machine learning. In some embodiments, the machine learning is based at least in part on determining an assignment of SSB beam indices to CPE 14 that results in a least noise floor. In some embodiments, the machine learning is based at least in part on locations of the plurality of CPE 14. In some embodiments, the machine learning is based at least in part on at least one measured data-over-cable service interface specification, DOCSIS, parameter. In some embodiments, the machine learning is based at least in part on at least one CPE 14 embedded wireless device uplink noise floor measurement.

Figure 12:
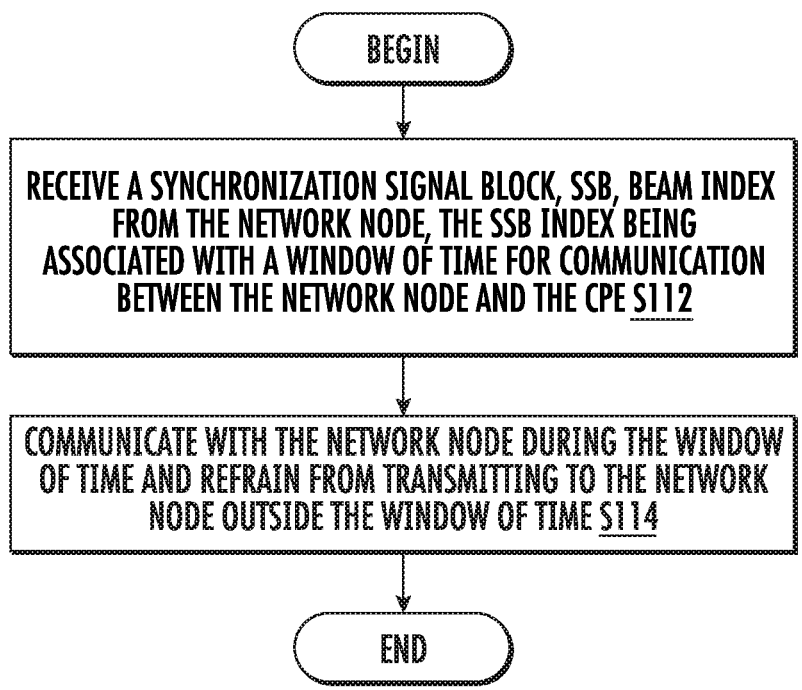
FIG. 12 is a flowchart of an example process in a CPE for 5G HFC-DAS according to principles set forth herein.

FIG. 12 is a flowchart of an example process in a CPE 14 according to some embodiments of the present disclosure. One or more blocks described herein may be performed by one or more elements of CPE 14 such as by one or more of processing circuitry 60 (including the UL enabling unit 61), and/or radio interface 56 and/or communication interface 54. CPE 14 such as via processing circuitry 60 and/or communication interface 54 is configured to receive a synchronization signal block, SSB, beam index from the network node, the SSB index being associated with a window of time for communication between the network node 12 and the CPE 14 (Block S112). The process also includes communicating with the network node during the window of time and refraining from transmitting to the network node outside the window of time (Block S114).

Figure 13:
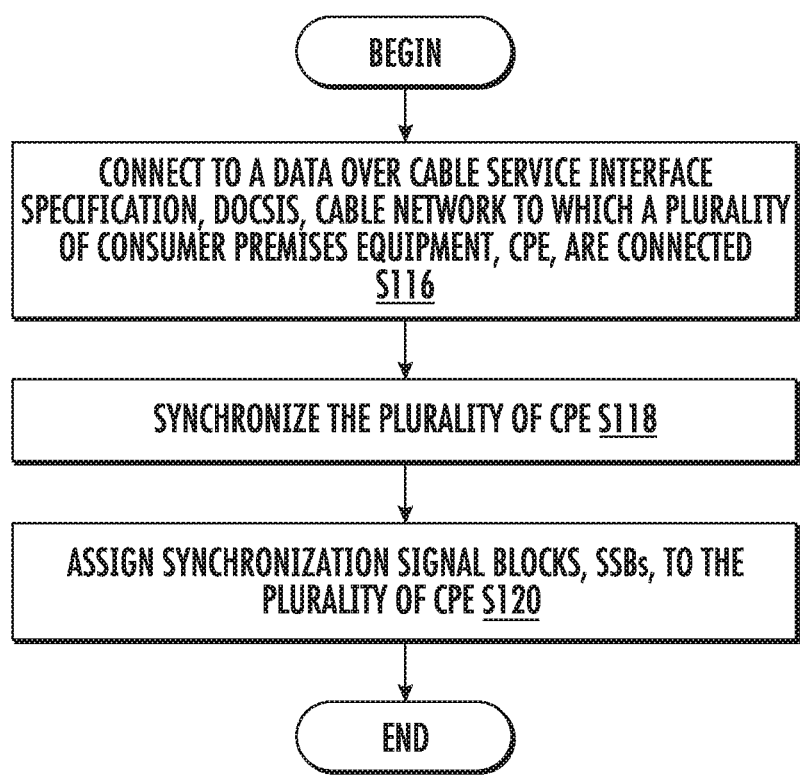
FIG. 13 is a flowchart of another example process in a network node for a 5G HFC-DAS with machine learning beam management according to principles set forth herein.

FIG. 13 is a flowchart of an example process in a network node for Fifth Generation (5G) hybrid fiber coax (HFC)-distributed antenna system (DAS) network with machine learning beam management. One or more blocks described herein may be performed by one or more elements of network node 12 such as by one or more of processing circuitry 30 (including the beam index assignment unit 12A and transmission gating unit 12B), processor 32, radio interface 26 and/or communication interface 24. Network node 12 such as via processing circuitry 30 and/or processor 32 and/or radio interface 26 and/or communication interface 24 is configured to connect to a Data Over Cable Service Interface Specification, DOCSIS, cable network to which the plurality of CPE 14 are connected (Block S116). The process also includes synchronizing the plurality of CPE 14

(Block S118). The process also includes assigning synchronization signal blocks, SSBs, to the plurality of CPE 14 (Block S120).

In some embodiments, a set of beam weights for a subset of CPE 14 of the plurality of CPE 14 are determined to correct impairments associated with the subset of CPE 14. In some embodiments, the set of beam weights for a subset of CPE 14 are determined in order to equalize a plurality of transmit carriers configured for the subset of CPE 14. In some embodiments, synchronizing the plurality of CPE 14 further includes synchronizing wireless devices connected wirelessly to the CPE 14.

The solutions disclosed herein may have one or more of the following advantages:

Minimization of the network node UL noise floor servicing large numbers of CPE 14;
Machine learning solves multivariable interference to optimize network performance;
Inter-CPE 14 cell interference is reduced substantially;
The solution can determine connected WD location to the CPE cell; and
Beamforming in the repeater improves coverage.

In some embodiments, the CPE 14 can be implemented in the cloud to perform virtual network functions.

Some embodiments enable a large number of CPEs to attach to a network node over a cable network, while maintaining the UL noise floor to acceptable performance limits. Some embodiments provide location information for WDs which are attached to the network node via the CPE 14.

Some embodiments connect CPE 14 to a network node through beam index assignment. In 3GPP, network node 12 RAN employs beam indices to pre-define spatial elevation/azimuth antenna coverage sectors. The 3GPP Technical Standard (TS) 38.213 defines the "5G; NR; Physical Layer Procedures for Control" including the P1/P2/P3 procedures for assignment of gNB antenna beam indices to attached WDs 18 (or CPE 14). Some embodiments assign unique beam index values to CPE 14 which are spatially distributed. These beam indices may be used to gate transmission and reception from the spatially separated CPE 14 so as to limit a rise in the UL noise floor. Some embodiments provide unique assignments of beam indices for up to 64 CPE 14.

A machine learning algorithm may be employed to extend the assignment of CPE 14 to beam indices while not impacting performance, respecting geographic locality of the CPE 14, and meeting regulatory E911 requirements for emergency WD locating indoors. Location may be within ±3 m representing the building floor; and within ±50 m representing azimuth accuracy. The machine learning algorithm may use multiple inputs for its algorithm including, at least one of the following:

CPE 14 unique identifier for communications;
CPE 14 unique international mobile subscriber identity (IMSI) identifier for a commercial, embedded WD terminal;
CPE 14 embedded commercial 3GPP WD terminal communications including radio resource management (RRM) messages to measure nearby cell strength, nearby Wi-Fi and Bluetooth low energy (BLE) transmissions, Global Positioning System/Global Navigation Satellite System (GPS/GNSS) signals, and sensors data such as air pressor sensors to assess the elevation/floor of the CPE 14;
CPE WD observed time difference of arrival (OTDoA) function to request, measure and respond with observed time difference of arrival (OTDoA) data of nearby 4G cell sites to estimate the CPE's approximate geographical location;
network node 12 data including CPE WD-to-beam index assignments;
network node 12 data including beam index weights applied to correct for cable impairments to the CPE 14;
network node 12 data including CPE 14 embedded WD uplink noise floor readings to enable machine learning algorithms to optimize network performance;
network node 12 data including the current active beam index of all attached network WDs;
UE data and ability to send RRM messages to network attached WDs, to assess cell site visibility of each WD attached to each CPE 14 with associated beam index; and/or
CPE 14 cable interface metrics including DOCSIS measured parameters used to monitor the received signal quality from the cable interface, including for cases where the CPE 14 includes an embedded DOCSIS cable modem.

According to one aspect, a network node 12 is configured to communicate with a customer premises equipment (CPE) 14. The network node 12 includes a communication interface 24 and/or processing circuitry 30 configured to assign a unique beam index to each of a plurality of CPEs 14 and gate transmission of signals to and reception of signals from each of the plurality of CPEs 14.

According to this aspect, in some embodiments, an assigned beam index defines a time interval during which uplink and downlink transmissions between the network node 12 and CPE 14 are allowed. In some embodiments, an assigned beam index is associated with a set of beamforming weights unique to a CPE 14. In some embodiments, the beamforming weights are grouped by machine learning to yield similar impairments. In some embodiments, a location of a wireless device served by a CPE 14 is associated with the location of the CPE 14 serving the wireless device.

According to another aspect, a method implemented in a network node 12 in communication with a customer premises equipment (CPE) 14 is provided. The method includes assigning a unique beam index to each of a plurality of CPEs 14 and gating transmission of signals to and reception of signals from each of the plurality of CPEs 14.

According to this aspect, in some embodiments, an assigned beam index defines a time interval during which uplink and downlink transmissions between the network node 12 and CPE 14 are allowed. In some embodiments, an assigned beam index is associated with a set of beamforming weights unique to a CPE 14. In some embodiments, the beamforming weights are grouped by machine learning to yield similar impairments. In some embodiments, a location of a wireless device served by a CPE 14 is associated with the location of the CPE 14 serving the wireless device.

According to yet another aspect, a customer premises equipment (CPE) 14 is configured to communicate with a network node 12 and wireless devices. The CPE 14 includes a communication interface and/or processing circuitry 60 configured to receive a beam index from the network node 12 and determine when to enable uplink transmissions from wireless devices 18 to the network node 12 based at least in part on the received beam index.

According to another aspect, a method implemented in a customer premises equipment (CPE) 14 configured to communicate with a network node 12 and wireless devices (WD) 18 is provided. The method includes receiving a beam index from the network node 12 and determining when to enable uplink transmissions from wireless devices 18 to the network node 12 based at least in part on the received beam index.

Some embodiments may include one or more of the following:

Embodiment A1. A network node configured to communicate with a customer premises equipment (CPE), the network node configured to, and/or comprising a radio interface and/or comprising processing circuitry configured to:
  assign a unique beam index to each of a plurality of CPEs; and
  gate transmission of signals to and reception of signals from each of the plurality of CPEs.

Embodiment A2. The network node of Embodiment A1, wherein an assigned beam index defines a time interval during which uplink and downlink transmissions between the network node and CPE are allowed.

Embodiment A3. The network node of Embodiment A1, wherein an assigned beam index is associated with a set of beamforming weights unique to a CPE.

Embodiments A4. The network node of Embodiment A3, wherein the beamforming weights are grouped by machine learning to yield similar impairments.

Embodiment A5. The network node of Embodiment A1, wherein a location of a wireless device served by a CPE is associated with the location of the CPE serving the wireless device.

Embodiment B1. A method implemented in a network node in communication with a customer premises equipment (CPE), the method comprising:
  assigning a unique beam index to each of a plurality of CPEs; and
  gating transmission of signals to and reception of signals from each of the plurality of CPEs.

Embodiment B2. The method of Embodiment B1, wherein an assigned beam index defines a time interval during which uplink and downlink transmissions between the network node and CPE are allowed.

Embodiment B3. The method of Embodiment B1, wherein an assigned beam index is associated with a set of beamforming weights unique to a CPE.

Embodiments B4. The method of Embodiment B3, wherein the beamforming weights are grouped by machine learning to yield similar impairments.

Embodiment B5. The method of Embodiment B1, wherein a location of a wireless device served by a CPE is associated with the location of the CPE serving the wireless device.

Embodiment C1. A customer premises equipment (CPE) configured to communicate with a network node and wireless devices, the CPE configured to, and/or comprising a radio interface and/or processing circuitry configured to:
  receive a beam index from the network node; and
  determine when to enable uplink transmissions from wireless devices to the network node based at least in part on the received beam index.

Embodiment D1. A method implemented in a customer premises equipment (CPE) configured to communicate with a network node and wireless devices (WD), the method comprising:
  receiving a beam index from the network node; and
  determining when to enable uplink transmissions from wireless devices to the network node based at least in part on the received beam index.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:

| Abbreviation | Explanation |
| --- | --- |
| 3GPP | Third Generation Partnership Program |
| CA | Carrier Aggregation |
| CPE | Customer Premises Equipment |
| CRAN | Centralized RAN |
| CU | Centralized Unit |
| CMTS | Cable Modem Termination System |
| CP | Control Plane |
| DAS | Distributed Antenna System |
| DOCSIS | Data over Cable Service Interface Specification |
| DU | Distributed Unit |
| DRAN | Distributed RAN |
| FE | Front-End |
| HFC | Hybrid Fiber Coax |
| IAB | Integrated Access Backhaul |
| IF | Intermediate Frequency |
| LTE | Long term evolution |
| MIMO | Multiple-input Multiple-output |
| MT | Mobile Terminal |
| NR | Next-generation Radio (5G) |
| OTA | Over the Air |
| RIBS | Radio-interface base-station sync, 3GPP TS 36.898 |
| RF | Radio Frequency |
| SU | Single-User |
| UP | User Plane |

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A network node configured to communicate with a plurality of customer premises equipment, CPE, the network node comprising:
processing circuitry configured to determine a set of beam weights for each CPE of the plurality of CPE, each set of beam weights being associated with a synchronization signal block, SSB, index, each SSB index being associated with a window of time for communication between the network node and CPE associated with a beam ID; and a communication interface in communication with the processing circuitry, the communication interface configured to transmit the SSB index to CPE associated with the beam ID to indicate to the CPE the window of time for communication between the network node and the CPE.

2. The network node of claim 1, wherein the set of beam weights for a subset of CPE of the plurality of CPE are determined in order to correct impairments associated with the subset of CPE.

3. The network node of claim 1, wherein the set of beam weights for a subset of CPE are determined in order to equalize a channel for transmit carriers configured for the CPE.

4. The network node of claim 1, wherein the processing circuitry is further configured to determine an allocation of SSBs to CPE that provides a least uplink noise floor.

5. The network node of claim 1, wherein the processing circuitry is further configured to determine a grouping of SSBs associated with CPE having impairment commonality.

6. The network node of claim 5, wherein the grouping of SSBs associated with CPE having impairment commonality is determined by machine learning.

7. The network node of claim 6, wherein the machine learning is based at least in part on determining an assignment of SSB beam indices to CPE that results in a least noise floor.

8. The network node of claim 6, wherein the machine learning is based at least in part on locations of the plurality of CPE.

9. The network node of claim 6, wherein the machine learning is based at least in part on at least one measured data-over-cable service interface specification, DOCSIS, parameter.

10. The network node of claim 6, wherein the machine learning is based at least in part on at least one CPE embedded wireless device uplink noise floor measurement.

11. A method in a network node configured to communicate with a plurality of customer premises equipment, CPE, the method comprising:
determining a set of beam weights for each CPE of the plurality of CPE, each set of beam weights being associated with a synchronization signal block, SSB, beam index, each SSB beam index being associated with a window of time for communication between the network node and CPE associated with the a beam ID; and
transmitting the SSB beam index to CPE associated with the beam ID to indicate to the CPE the window of time for communication between the network node and the CPE.

12. The method of claim 11, wherein the set of beam weights for subset of CPE of the plurality of CPE are determined in order to correct impairments associated with the subset of CPE.

13. The method of claim 11, wherein the set of beam weights for a subset of CPE are determined in order to equalize a channel for transmit carriers configured for the CPE.

14. The method of claim 11, further comprising determining an allocation of SSBs to CPE that provides a least uplink noise floor.

15. The method of claim 11, further comprising determining a grouping of SSBs associated with CPE having impairment commonality.

16. The method of claim 15, wherein the grouping of SSBs associated with CPE having impairment commonality is determined by machine learning.

17. The method of claim 16, wherein the machine learning is based at least in part on determining an assignment of SSB beam indices to CPE that results in a least noise floor.

18. The method of claim 16, wherein the machine learning is based at least in part on locations of the plurality of CPE.

19. The method of claim 16, wherein the machine learning is based at least in part on at least one measured data-over-cable service interface specification, DOCSIS, parameter.

20. The method of claim 16, wherein the machine learning is based at least in part on at least one CPE embedded wireless device uplink noise floor measurement.

* * * * *